United States Patent
Matsui

[19]

[11] Patent Number: 5,878,023
[45] Date of Patent: Mar. 2, 1999

[54] INFORMATION RECORDING MEDIUM HAVING OPTICALLY READABLE DATA CODE PATTERN RECORDED THEREON AND WHICH CAN BE MANUALLY SCANNED, AND INFORMATION REPRODUCTION APPARATUS THEREFOR

[75] Inventor: Shinzo Matsui, Yamanashi-ken, Japan

[73] Assignee: Olympus Optical Co. Ltd., Tokyo, Japan

[21] Appl. No.: 532,982

[22] Filed: Sep. 22, 1995

[30] Foreign Application Priority Data

Oct. 5, 1994 [JP] Japan .................................. 6-241150

[51] Int. Cl.⁶ .................................. G11B 3/70; G11B 5/09
[52] U.S. Cl. ............................ 369/275.3; 360/48; 360/47
[58] Field of Search ............................ 369/275.2, 275.3, 369/275.1, 275.4, 32, 112, 47, 48, 49, 59, 93, 124; 360/39, 40, 47, 48, 49, 54

[56] References Cited

U.S. PATENT DOCUMENTS 5,124,536  6/1992  Priddy et al. .

FOREIGN PATENT DOCUMENTS 58-203586  11/1983  Japan .
WO 94/08314  4/1994  WIPO .

*Primary Examiner*—Paul W. Huber
*Attorney, Agent, or Firm*—Frishauf, Holtz, Goodman, Langer & Chick, P.C.

[57] ABSTRACT

A dot code consists of a group of plurality of blocks arranged in a matrix manner, and each block has markers, an array direction detecting code, a block address, and block recorded data. A dot code in which two rows and (N/2) columns of N blocks having block addresses 1 to N are arranged and which has an effective code width CEW is doubly provided, i.e., two such dot codes are recorded parallel on an information recording medium. A recording code width CRW in this case is twice the effective code width CEW.

12 Claims, 12 Drawing Sheets

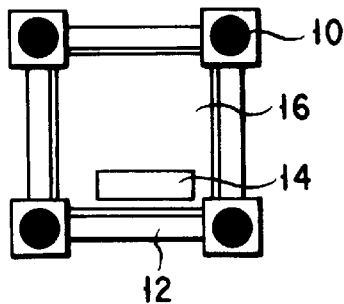
FIG. 1A (PRIOR ART)
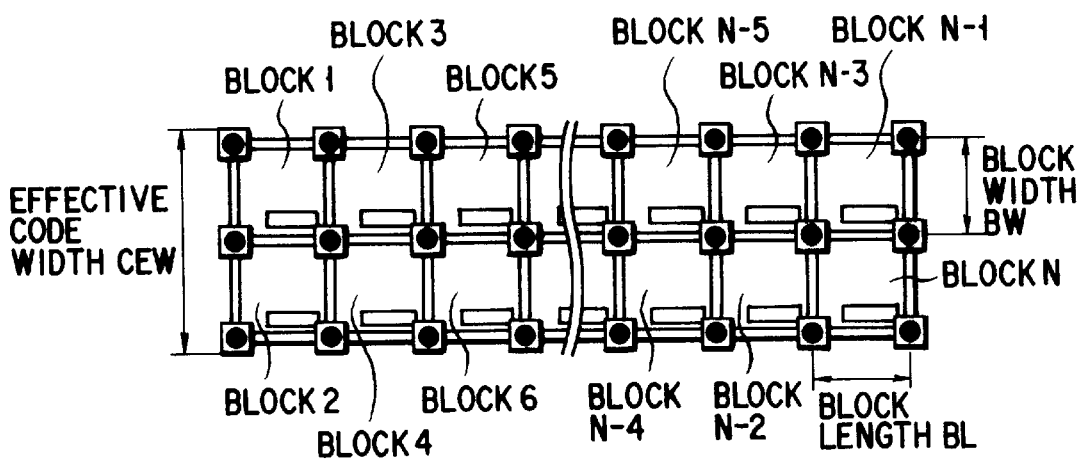
FIG. 1B (PRIOR ART)
SCANNING DIRECTION →
| 1 | 3 | 5 | | N-5 | N-3 | N-1 |
|---|---|---|---|---|---|---|
| 2 | 4 | 6 | | N-4 | N-2 | N |
FIG. 1C (PRIOR ART)

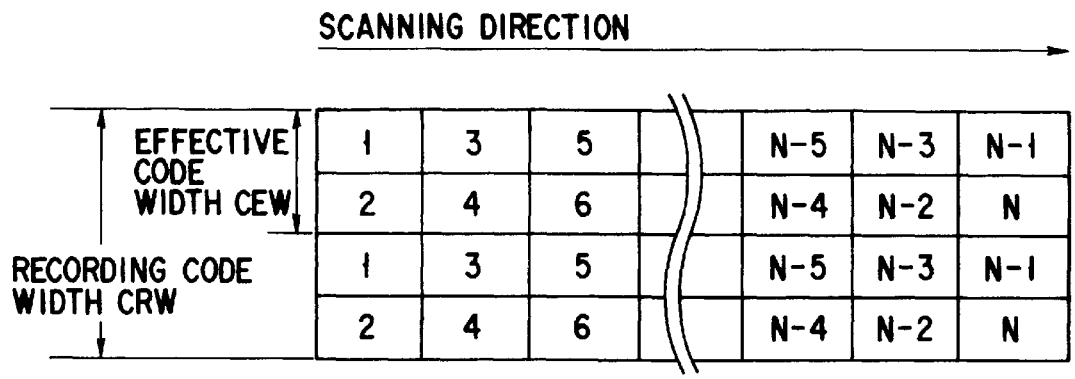
F I G. 3A
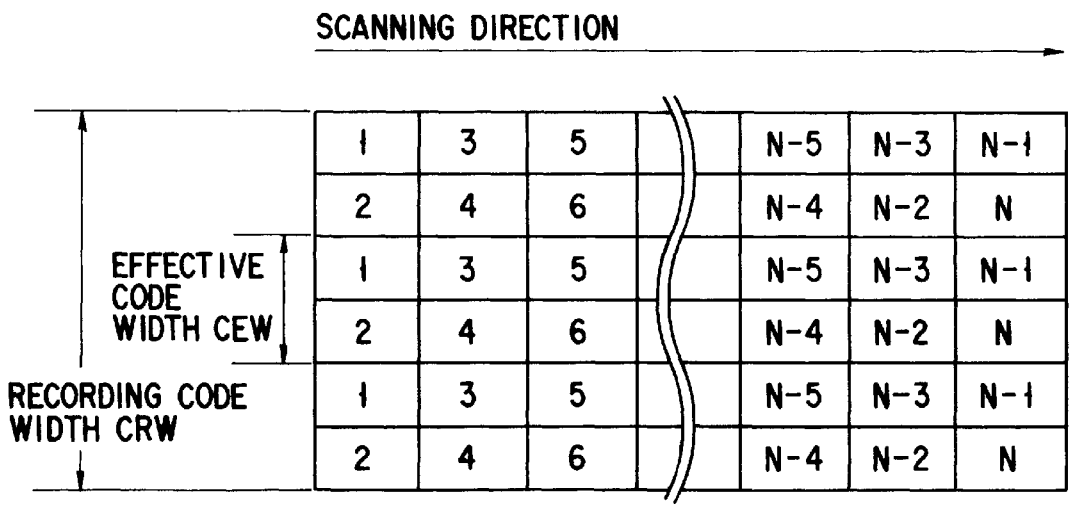
F I G. 3B

| EFFECTIVE CODE WIDTH CEW | N-5 | N-2 | 1 | 4 | 7 | ⁄⁄ | N-8 | N-5 | N-2 |
|---|---|---|---|---|---|---|---|---|---|
| | N-4 | N-1 | 2 | 5 | 8 | | N-7 | N-4 | N-1 |
| | N-3 | N | 3 | 6 | 9 | | N-6 | N-3 | N |
| | N-5 | N-2 | 1 | 4 | 7 | | N-8 | N-5 | N-2 |

RECORDING CODE WIDTH CRW

F I G. 5A

| EFFECTIVE CODE WIDTH CEW | 1 | 4 | 7 | ⁄⁄ | N-8 | N-5 | N-2 | 1 | 4 |
|---|---|---|---|---|---|---|---|---|---|
| | 2 | 5 | 8 | | N-7 | N-4 | N-1 | 2 | 5 |
| | 3 | 6 | 9 | | N-6 | N-3 | N | 3 | 6 |
| | 1 | 4 | 7 | | N-8 | N-5 | N-2 | 1 | 4 |

RECORDING CODE WIDTH CRW

F I G. 5B

←——— RECORDING CODE LENGTH CRL ———→
←——— EFFECTIVE CODE LENGTH CEL ———→

| RECORDING CODE WIDTH CRW / EFFECTIVE CODE WIDTH CEW | 1 | 11 | | | | N-19 | N-9 | 1 | 11 |
|---|---|---|---|---|---|---|---|---|---|
| | 2 | 12 | | | | N-18 | N-8 | 2 | 12 |
| | 3 | 13 | | | | N-17 | N-7 | 3 | 13 |
| | 4 | 14 | | | | N-16 | N-6 | 4 | 14 |
| | 5 | 15 | | | | N-15 | N-5 | 5 | 15 |
| | 6 | 16 | | | | N-14 | N-4 | 6 | 16 |
| | 7 | 17 | | | | N-13 | N-3 | 7 | 17 |
| | 8 | 18 | | | | N-12 | N-2 | 8 | 18 |
| | 9 | 19 | | | | N-11 | N-1 | 9 | 19 |
| | 10 | 20 | | | | N-10 | N | 10 | 20 |
| | 1 | 11 | | | | N-19 | N-9 | 1 | 11 |
| | 2 | 12 | | | | N-18 | N-8 | 2 | 12 |

F I G. 5C

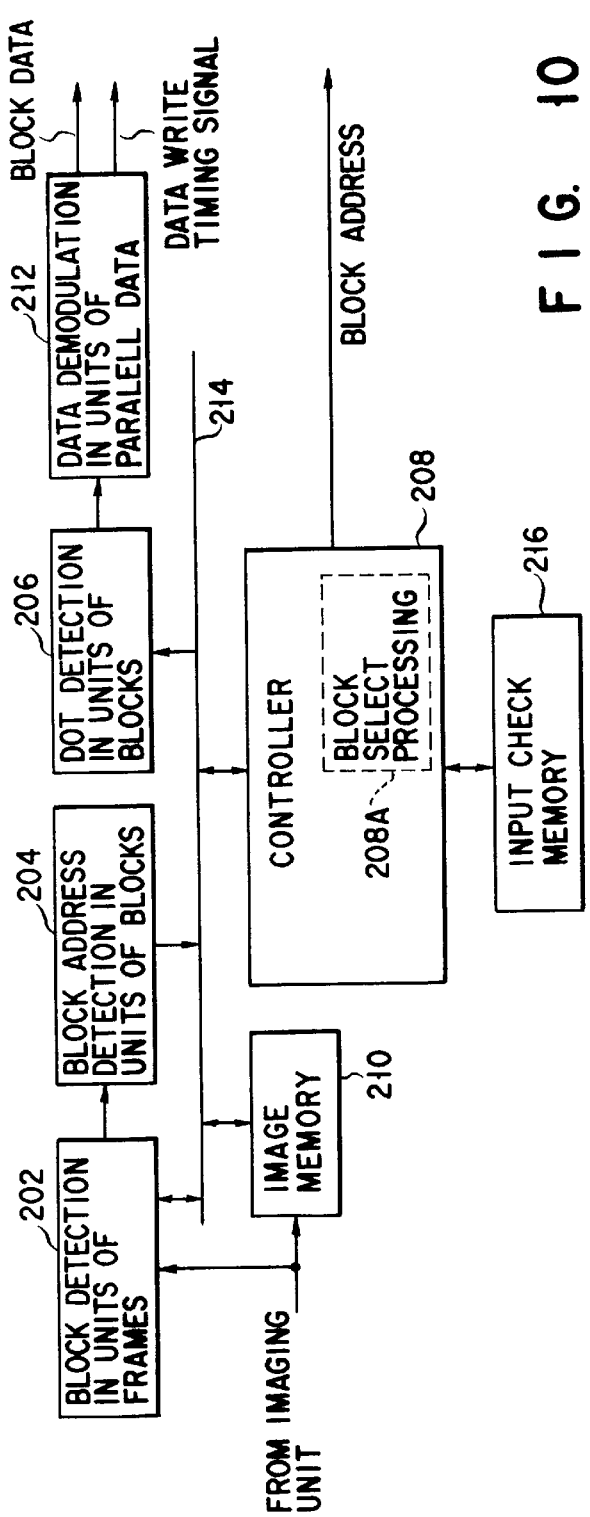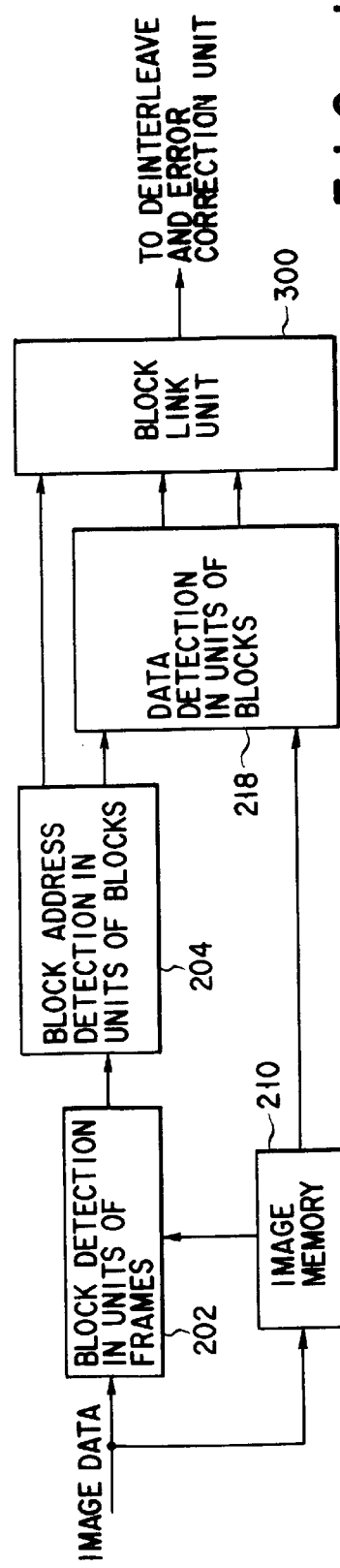

INFORMATION RECORDING MEDIUM HAVING OPTICALLY READABLE DATA CODE PATTERN RECORDED THEREON AND WHICH CAN BE MANUALLY SCANNED, AND INFORMATION REPRODUCTION APPARATUS THEREFOR

BACKGROUND OF THE INVENTION

1. Field of the Invention

The present invention relates to an information recording medium such as a sheet of paper which records, as an optically readable code pattern, so-called multimedia information including audio information such as voice and music, video information obtained from, e.g., cameras and video apparatuses, and digital code data obtained from personal computers and wordprocessors, and also relates to an information reproduction apparatus for optically reading the code pattern recorded in such an information recording medium and reproducing the original multimedia information.

2. Description of the Related Art

Conventionally, various media such as magnetic tapes and optical disks are known as media for recording voice, music, and the like information. Unfortunately, the unit costs of these media are relatively high even if a large quantity of copies of them are made, and the media require a large spare for keeping them. Furthermore, if it is necessary to deliver a medium recording voice to another person in a remote place, the delivery requires much labor and time regardless of whether the medium is mailed or directly brought. This similarly applies to all kinds of so-called multimedia information, other than audio information, which includes video information obtained from, e.g., cameras and video apparatuses and digital code data obtained from, e.g., personal computers and wordprocessors.

The inventor team including the present inventor therefore invented a system for recording multimedia information, which includes at least one of audio information, video information, and digital code data, in an information recording medium such as a sheet of paper in the form of a dot code as image information, i.e., coded information which can be transmitted by a facsimile apparatus and a large quantity of copies of which can be inexpensively made, and also invented a system for reproducing the information. This invention was described and claimed in International Application No. PCT/JP93/01377 (U.S. Ser. No. 08/407,018) and internationally published in Apr. 14, 1994, as International Publication No. WO94/08314.

A dot code disclosed in the above international application comprises a group of a plurality of blocks arranged in a matrix manner. Each block has a data dot pattern including a plurality of dots arranged in accordance with the contents of data and a block address pattern which is arranged to have a predetermined positional relationship with the data dot pattern and indicates the address of the block.

That is, as illustrated in FIG. 1A, each block is constituted by a marker 10, an array direction detecting code 12, a block address 14, and block recorded data 16. The markers 10 are recorded as large circular dots, and the block recorded data 16 is constituted by an array of dots far smaller than the markers 10 (for example, the dot diameter of the data 16 is 1/7 the diameter of the marker dot).

These blocks are two-dimensionally arranged to form a dot code as illustrated in FIG. 1B. In FIG. 1B, this dot code is formed by two blocks in the vertical direction and N/2 blocks in the horizontal direction. Data reproduced from all of these two-dimensionally arranged blocks is reproduced as one code. Note that the block addresses 14 represent numbers 1 to N such as indicated by BLOCK 1, BLOCK 2, BLOCK 3, . . . , BLOCK N in FIG. 1B. Note also that each block has a vertical size (block width BW) and a horizontal size (block length BL), and a 2-block vertical size corresponds to the width of a dot code, which is called an effective code width CEW.

FIG. 1C shows the arrangement in FIG. 1B in a simplified form only by describing the block addresses 14.

The above international application of this information reproduction system has disclosed a method in which an information reproduction apparatus for optically reading and reproducing such a dot code recorded on an information recording medium is held in an operator's hand and manually scanned on the recording medium along the recorded dot code to thereby read the dot code.

FIG. 2A illustrates an example of the shape of this reader. As in FIG. 2A, it is possible to hold a reader 20 in an operator's hand such that the reader 20 is perpendicular to a dot code 18, i.e., the surface of a recording medium, and to scan the reader 20 in the longitudinal direction of the dot code 18. In this case the dot code 18 can be read regardless of the scanning direction because the block addresses 14 are written in the dot code as described above. That is, information recorded as the dot code 18 can be reproduced by manually scanning the reader 20 from one end to the other of the dot code 18.

In performing this manual scanning, a scanning position indication mark 22 can be formed on the reader 20, as an index, by which the reader 20 is scanned along the dot code 18. Examples of this scanning position indication mark 22 are an indication mark corresponding to the width of the dot code 18, FIG. 2A, the left side, and an indication mark indicative of the center of the reader 20, FIG. 2A, the right side.

This scanning position indication mark 22 allows an operator to scan the reader 20, while taking account of the width of the dot code 18, or along the center of the dot code 18, by seeing the scanning position indication mark 22. This makes a correct scanning along the dot code 18 feasible.

In practice, however, as illustrated in FIG. 2B, when the reader 20 is manually scanned on the dot code 18 from the left end to the right end the scan may sometimes be zigzagged by a shake as indicated by a scan locus 24. This produces a code portion 26 which is not read during the scan. This zigzag amount, i.e., a scan shake maximum value $v_{max}$ is at most a few hundred microns in the case of a mechanical automatic scan. However, in the manual scan case this value can be 2 to 3 mm although it depends upon an individual difference.

As shown in FIG. 2C, assuming the width of the dot code 18 is a code width CW, the horizontal size of an imaging area 28 is an imaging length GV, and the vertical size of the imaging area 28 is an imaging width GH, the allowable amount, A, of this shake is given by $$A = \frac{GH - CW}{2}$$

Note that this equation holds when the code width CW is the same as the effective code width CEW.

Also, as shown in FIG. 2D, when the scan is manually done the imaging area 28 is in some instances rotated during imaging. In this case the allowable amount A becomes smaller than that in the case of FIG. 2C and is given by $$A = \frac{G'H - CW}{2}$$

where G'H is the effective imaging width given by $$G'H = GH \times \cos(\theta) - GV \times \sin(\theta)$$

Furthermore, the code portion 26 which is not read during the scan is sometimes produced by some other reasons than the shake. That is, as shown in FIG. 2B, not the entire bottom surface (i.e., an area 30 in which the casing of the reader covers the paper surface) of the reader 20 is the imaging area 28. Accordingly, if at the start of the scan the operator sets the reader 20 at the left end of the dot code 18, i.e., holds the reader 20 such that the casing of the reader 20 covers the dot code 18, the imaging area 28 does not image the left end of the dot code 18 in some cases. Consequently, the code portion 26 which is not read during the scan is produced on the scan start end of the dot code 18. Similarly, at the end of the scan, i.e., when the operator manually scans the reader 20 from the left end to the right and stops the reader at the right end, a code portion at the right end is sometimes left unread without being imaged. That is, the code portion 26 which is not read during the scan takes place at the scan termination end of the dot code 18.

SUMMARY OF THE INVENTION

The present invention has been made in consideration of the above situation and has as its object to provide an information recording medium and an information reproduction apparatus capable of accurately reading and reproducing a code pattern by manually scanning a reader even if a shake occurs or the reader is placed in an inadequate position at the start or the end of the scan.

According to a first aspect of the present invention, there is provided an information recording medium comprising: a sheet-like member; and a data code pattern recorded on the sheet-like member and optically readable, wherein the data code pattern consists of a group of a plurality of blocks arranged in a matrix manner, each block has a data dot pattern consisting of a plurality of dots arranged in accordance with contents of data and a block address pattern arranged to have a predetermined positional relationship with the data dot pattern and indicating an address of the block, and the data code pattern is formed by doubly arranging blocks identical with blocks in a predetermined area of the blocks arranged in the block group.

According to a second aspect of the present invention, there is provided an information recording medium comprising: a sheet-like member; and a data code pattern recorded on the sheet-like member and optically readable, wherein the data code pattern consists of a group of a plurality of blocks arranged in a matrix manner, each block has a data dot pattern consisting of a plurality of dots arranged in accordance with contents of data and a block address pattern arranged to have a predetermined positional relationship with the data dot pattern and indicating an address of the block, and the data code pattern is formed by arranging dummy blocks, each of which has a shape not visually different from the blocks and does not essentially have data contents, in a predetermined peripheral region of the block group.

According to a third aspect of the present invention, there is provided an information recording medium comprising: a sheet-like member; and a data code pattern recorded on the sheet-like member and optically readable, wherein the data code pattern consists of a group of a plurality of blocks arranged in a matrix manner, each block has a data dot pattern consisting of a plurality of dots arranged in accordance with contents of data and a block address pattern arranged to have a predetermined positional relationship with the data dot pattern and indicating an address of the block, and the data code pattern is formed by doubly arranging a larger number of outside blocks than the number of inside blocks of blocks arranged parallel to a scanning direction of the block group.

According to a fourth aspect of the present invention, there is provided an information reproduction apparatus comprising: reading means for optically reading a data code pattern from an information recording medium according to any of the first to third aspects; restoring means for converting the data code pattern read by the reading means into original multimedia information including at least one of audio information, video information, and digital code data; and output means for outputting the multimedia information restored by the restoring means, wherein the reading means includes an imaging unit for imaging the data code pattern recorded on the information recording medium, and the restoring means includes a restoration controller for controlling the restoration such that if a plurality of doubly arranged blocks of the data code pattern are doubly imaged by the imaging unit, the doubly recorded blocks are not doubly restored.

According to a fifth aspect of the present invention, there is provided an information reproduction apparatus comprising: reading means for optically reading a data code pattern from an information recording medium according to any of the first to third aspects; restoring means for converting the data code pattern read by the reading means into original multimedia information including at least one of audio information, video information, and digital code data; and output means for outputting the multimedia information restored by the restoring means, wherein the reading means includes an imaging unit for imaging the data code pattern recorded on the information recording medium, and the restoring means includes: processing means for restoring the data code pattern in units of blocks; and a restoration controller for controlling the restoration such that in restoring a doubly recorded block of the data code pattern by the processing means, if an identical block already restored is present, data of the newly restored block is output in place of data of the identical block.

According to a sixth aspect of the present invention, there is provided an information reproduction apparatus comprising: reading means for optically reading a data code pattern from an information recording medium according to any of the first to third aspects; restoring means for converting the data code pattern read by the reading means into original multimedia information including at least one of audio information, video information, and digital code data; and output means for outputting the multimedia information restored by the restoring means, wherein the reading means includes an imaging unit for imaging the data code pattern recorded on the information recording medium, and the restoring means includes: processing means for restoring the data code pattern in units of blocks; detected state determining means for determining detected states of a block, a block address, and data in units of blocks; and a restoration controller for controlling the restoration, in accordance with the detected states determined by the detected state determining means, such that block data in a good detected state is selectively output from the doubly recorded block data.

According to a seventh aspect of the present invention, there is provided an information reproduction apparatus comprising: reading means for optically reading an optically readable data code pattern from an information recording medium including a portion in which the data code pattern is recorded; restoring means for converting the data code pattern read by the reading means into original multimedia information including at least one of audio information, video information, and digital code data; and output means for outputting the multimedia information restored by the restoring means, wherein the reading means includes an imaging unit for imaging the data code pattern recorded on the information recording medium, and the restoring means includes processing terminating means for terminating the restoration if the imaging means determines that an image different from the data code pattern is detected for a predetermined time.

According to an eighth aspect of the present invention, there is provided an information recording medium comprising: a sheet-like member; and a data code pattern recorded on the sheet-like member and optically readable, wherein the data code pattern consists of a group of a plurality of blocks arranged in a matrix manner, each block has a data dot pattern consisting of a plurality of dots arranged in accordance with contents of data and a block address pattern arranged to have a predetermined positional relationship with the data dot pattern and indicating an address of the block, a reproduction apparatus for optically reading the data code pattern and reproducing the data has an imaging unit whose imaging range of one image can image at least [M−1] blocks in a scanning direction or a direction perpendicular to the scanning direction, the reproduction apparatus performing reproduction from a plurality of images, and the data code pattern is formed by continuously arranging K identical sets by regarding N consecutive block columns in the block group as one set.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1A is a view showing the arrangement of a conventional block;

FIG. 1B is a view showing the arrangement of a conventional dot code;

FIG. 1C is a view showing a conventional block array;

FIGS. 3A and 3B are views showing examples of the block array of a dot code used in the first embodiment of an information recording medium of the present invention;

FIGS. 5A to 5C are views showing examples of the block array of a dot code used in the third embodiment of the information recording medium of the present invention;

FIG. 10 is a block diagram showing an image unit block data reproduction unit which does not process already input blocks in the first embodiment of the information reproduction apparatus of the present invention;

FIG. 12 is a block diagram showing an overwrite type image unit block data reproduction unit in the second embodiment of the information reproduction apparatus of the present invention;

DETAILED DESCRIPTION OF THE PREFERRED EMBODIMENTS

Figure 2C:
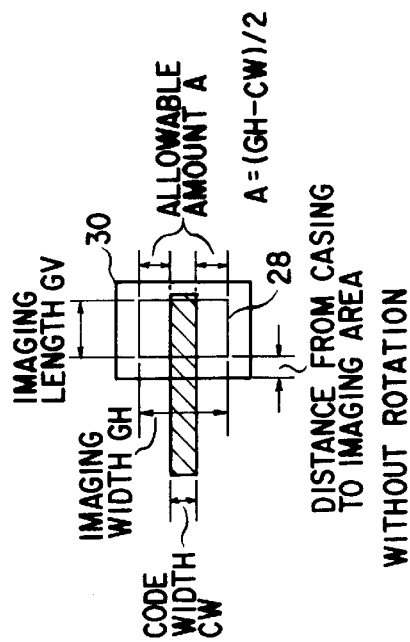
FIG. 2C is a view for explaining a conventional allowable shake amount.
Figure 2D:
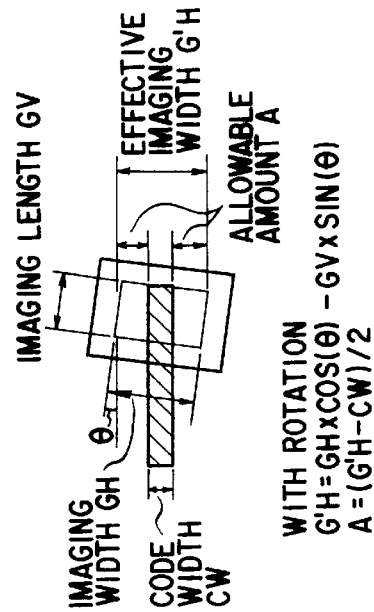
FIG. 2D is a view for explaining a conventional allowable rotational shake amount.

Embodiments of the present invention will be described below with reference to the accompanying drawings.

First, dot codes recorded in an information recording medium will be described.

Note that in the following description, as in the description given previously, assume a dot code consists of a group of a plurality of blocks arranged in a matrix manner and, as illustrated in FIG. 1A, each block consists of at least a marker 10, an array direction detecting code 12, a block address 14, and a block recorded data 16. That is, in the dot code these blocks are two-dimensionally arranged as shown in FIG. 1B, and the block addresses 14 represent numbers 1 to N such as indicated by BLOCK 1, BLOCK 2, BLOCK 3, . . . , BLOCK N in FIG. 1B. This block array will be simplified by describing the block addresses 14 alone as illustrated in FIG. 1C.

FIG. 3A shows a dot code used in the first embodiment of an information recording medium of the present invention. In FIG. 3A, the dot code as illustrated in FIG. 1C is doubled, i.e., two such dot codes are arranged parallel and recorded on a recording medium such as a sheet of paper. Referring to FIG. 3A, an effective code width CEW is the same portion as that of the dot code in FIG. 1C, which indicates a code portion required to reproduce the dot code.

With this block array as described above, the dot code as shown in FIG. 1C can be reproduced even if an imaging area is more or less moved by a shake when a reproduction apparatus is scanned in the scanning direction. That is, in order that an imaging area can read the first to fourth rows of the dot code as shown in FIG. 3A, when a reader accurately traces the dot code, the imaging width of the imaging area is made larger than a recording code width CRW. Accordingly, even if the imaging area is moved up or down by a shake during the scan, the data can be reliably reproduced so long as two rows of blocks are present in the imaging area (i.e., as long as blocks arranged in the first and second rows exist in the imaging area, if the imaging area is moved upward, and blocks arranged in the third and fourth rows exist in the imaging area, if the imaging area is moved downward).

That is, in this case the allowance of a shake is increased by an amount of (recording code width CRW—effective code width CEW) compared to that in FIG. 1C.

FIG. 3B shows a modification of this first embodiment, in which the dot code is tripled, i.e., three dot codes are recorded parallel.

In a similar fashion as above, even if the imaging area is moved upward by a shake, reproduction is possible as long as the imaging area includes blocks arranged in the two upper rows. Analogously, even if the imaging area is moved downward reproduction is possible so long as the area includes blocks arranged in the two lower rows. The shake allowance also is increased by (CRW−CEW) as in the above case.

As described above, the shake allowance can be increased by doubly (triply) recording identical dot codes.

Dot codes used in the second embodiment of the information recording medium of the present invention will be described below. In this embodiment, when a dot code is constituted by blocks a shake can be allowed by duplicating blocks, rather than the dot code as in the first embodiment.

Figure 4A:
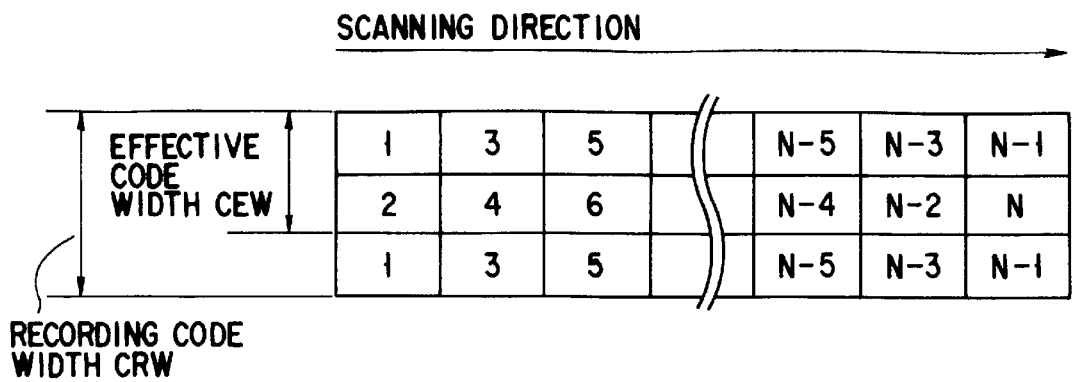
FIGS. 4A to 4C are views showing examples of the block array of a dot code used in the second embodiment of the information recording medium of the present invention.

That is, as illustrated in FIG. 4A, of a dot code formed by arranging two rows of blocks, blocks in one row, in this embodiment blocks 1, 3, 5, . . . in the first row, are added to the bottom of that code. In comparison with the dot code in FIG. 1C, the allowance of a shake of this dot code is increased by an amount of (recording code width CRW—effective code width CEW).

Figure 4B:
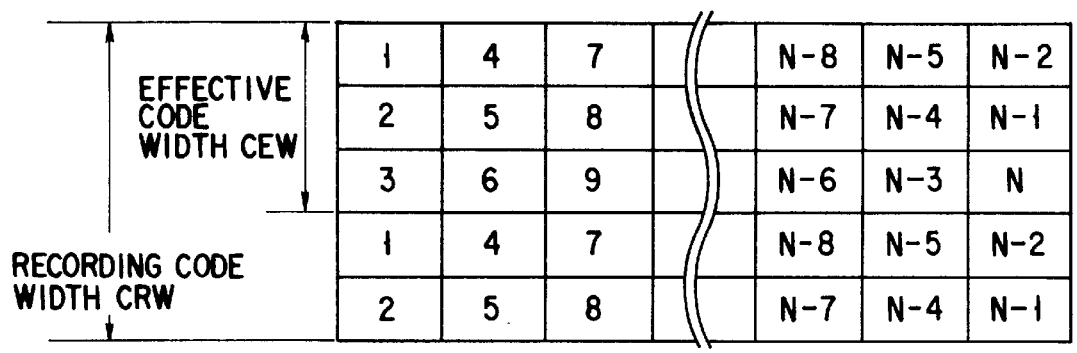

FIG. 4B shows a dot code in which two rows of blocks are added to a dot code consisting of three rows of blocks. Consequently, the allowance is increased by two blocks in the widthwise direction of the dot code.

Figure 4C:
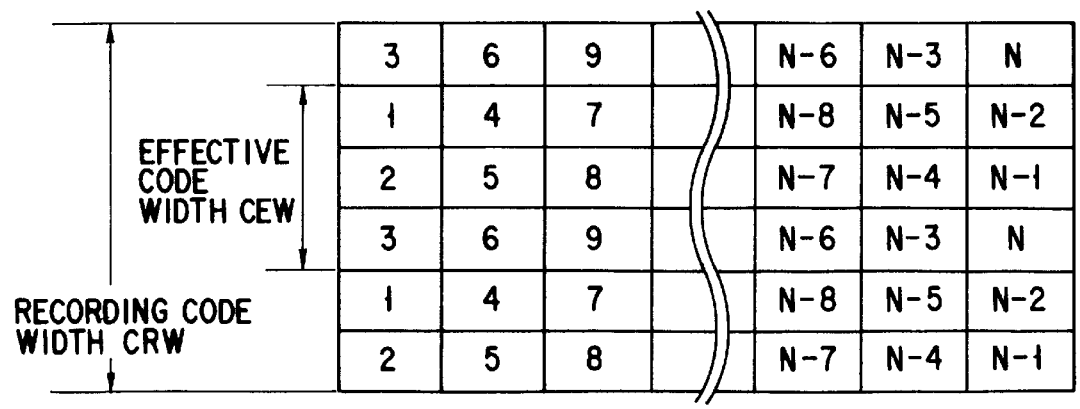

FIG. 4C shows an example in which blocks in two upper rows are recorded in the lower portion, and blocks in the last row are recorded in the upper portion. This arrangement also can allow a shake in a similar fashion as above.

As described above, in a dot code formed by arranging n rows and m columns of blocks it is possible to increase the allowance of a shake by doubly recording a few rows of blocks in the upper or lower portion of the dot code.

Dot codes used in the third embodiment of the information recording medium of the present invention will be described below. This embodiment is for processing a code portion which is produced at the start or the end of scan and is not read during the scan.

That is, FIG. 5A shows a dot code in which one row of blocks is added to the bottom of the dot code like in the second embodiment, and two columns of blocks at the right end are also added to the left end of the dot code.

The addition of the right-end blocks to the left end as described above makes it possible to reproduce this dot code as one code, even if the blocks in the leftmost column and the blocks in the rightmost column are left unread. Also, this code is reproducible even if the blocks at the left end are read but the blocks in the two columns at the right end are unread. Conversely, the dot code is reproducible as one code even if the blocks in the two columns at the left end are unread but all the blocks at the right end are read. That is, the addition of two columns of blocks to the left end makes reproduction of this code feasible even if blocks in columns at either the left or the right end are left unread to some extent.

FIGS. 5B and 5C illustrate dot codes in which, in contrast to the dot code in FIG. 5A, two columns of blocks at the left end are added to the right end. These dot codes also can achieve the same effect as the dot code shown in FIG. 5A.

Figure 6:
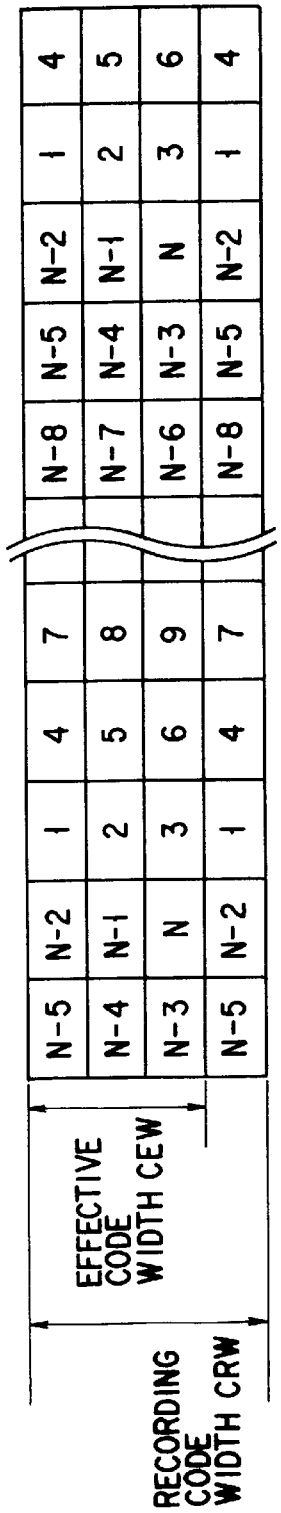
FIG. 6 is a view showing still another example of the block array of the dot code used in the third embodiment of the image recording medium of the present invention.

FIG. 6 shows a dot code in which two columns of blocks at the left end are recorded in the right end and two columns of blocks at the right end are recorded in the left end, i.e., a total of four columns of blocks are added. With this arrangement the code is reproducible even if four columns of blocks at the left and the right ends are left unread.

As described above, in a dot code having an array of n rows and m columns of blocks, blocks in a plurality of columns at least at one end are doubly recorded in the other end. Consequently, the dot code can be accurately read and reproduced even if a reader is placed in an inadequate position at the start or the end of scan.

Note that instead of duplicating larger numbers of outside blocks than the numbers of inside blocks, it is also possible to perform the duplication such that the outer the position of blocks the larger the number of the blocks. As an example, blocks arranged in the horizontal direction such as "1, 2, 3" can be duplicated not only like "3, 1, 2, 3, 1" but also like "3, 3, 3, 1, 1, 2, 3, 3, 1, 1, 1". This similarly applies to blocks in the vertical direction.

The relationship between the effective code width CEW and the effective imaging width will be described below with reference to FIG. 7. The imaging code width is a width by which the effective code width CEW of a code can be reliably imaged even if a shake occurs during a scan. Accordingly, this imaging code width is the sum length of the effective code width CEW of a code and the width of a block pattern which is a minimum unit by which recorded data is reproducible from image information. In the example shown in FIG. 7, the effective imaging width corresponds to three blocks since effective code width CEW=2 blocks. That is, in this example effective imaging width=recording code width CRW.

Figure 7:
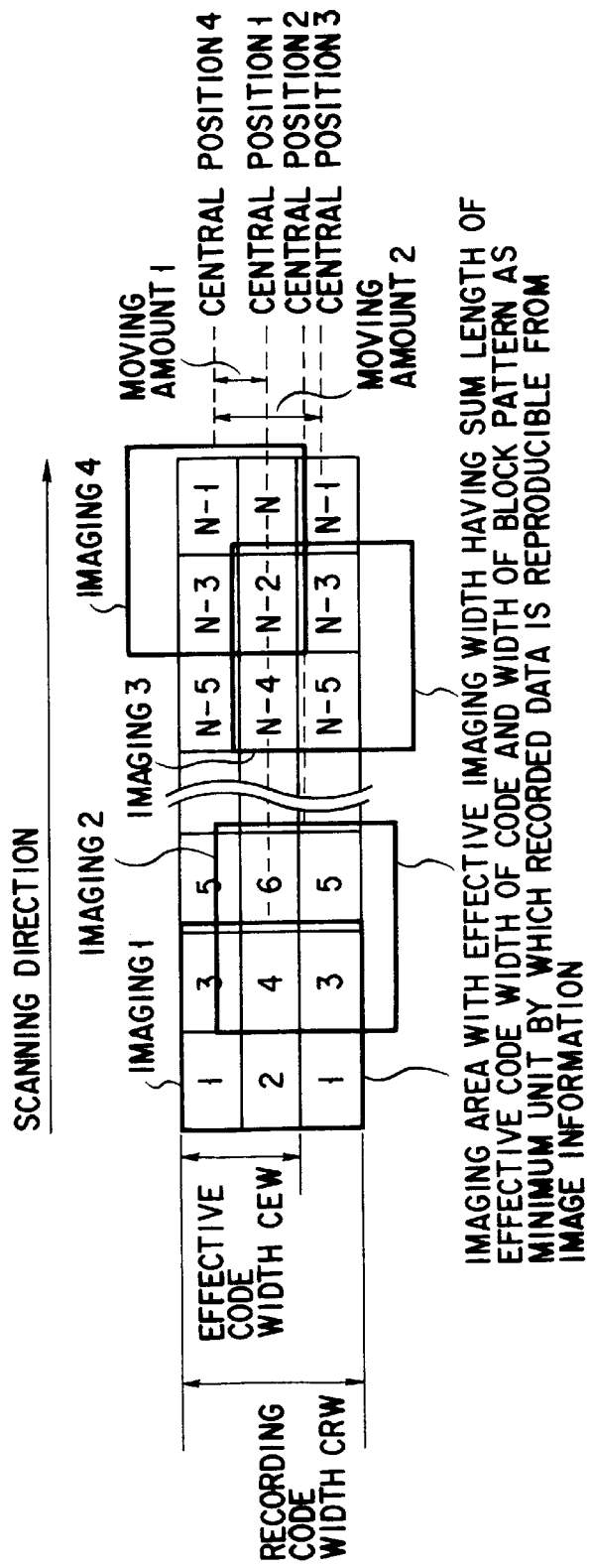
FIG. 7 is a view for explaining the relationship between the effective code width and the effective imaging width.

Assume, as illustrated in FIG. 7, that in this dot code the imaging position is first accurately located in the dot code position as indicated by "IMAGING 1", and then images are scanned while being shaken as indicated by "IMAGING 2", "IMAGING 3", and "IMAGING 4". In this case, in "IMAGING 2" blocks 3 and 5 in the first row are not photographed but blocks 3 and 5 in the third row are photographed. Consequently, all of necessary blocks 3, 4, 5, and 6 are imaged and reproducible.

Also, as already described earlier, in this dot code scan a vertical movement by a shake from the position indicated by "IMAGING 4" to the position indicated by "IMAGING 3" is allowed. That is, this dot code is reproducible even if there is a vertical movement by a shake from "CENTRAL POSITION 4" to "CENTRAL POSITION 3", i.e., if there is "MOVING AMOUNT 2".

More specifically, a reader having an effective imaging width larger by one block than the effective code width CEW allows a shake with respect to the dot codes illustrated in FIGS. 4A to 6 and also can reproduce an effective information amount. Note that the effective imaging width also can, of course, have a width larger by more than one block than the effective code width CEW.

Embodiments of an information reproduction apparatus of the present invention which optically reads and reproduces a dot code, which is recorded on an information recording medium and in which blocks are duplicated in the row or the column direction as described above, will be described below.

Figure 8:
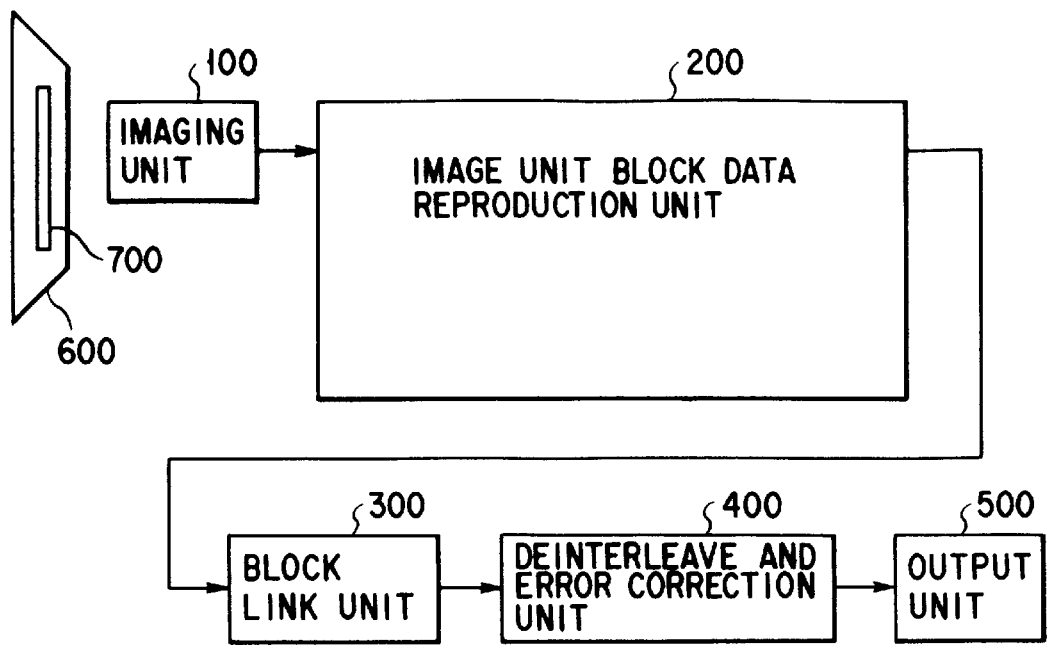
FIG. 8 is a block diagram showing the first embodiment of an information reproduction apparatus of the present invention.

FIG. 8 is a block diagram showing the arrangement of the first embodiment of the information reproduction apparatus of the present invention. This information reproduction apparatus comprises an imaging unit 100, an image unit block data reproduction unit 200, a block link unit 300, a deinterleave and error correction unit 400, and an output unit 500. Of these units, at least the imaging unit 100 is incorporated into a handy reader (not shown) for manually scanning a code 700 recorded on a sheet 600 as a recording medium.

The imaging unit 100 is an area sensor such as a CCD. The image unit block data reproduction unit 200 reproduces block data in units of photographed images.

Figure 9:
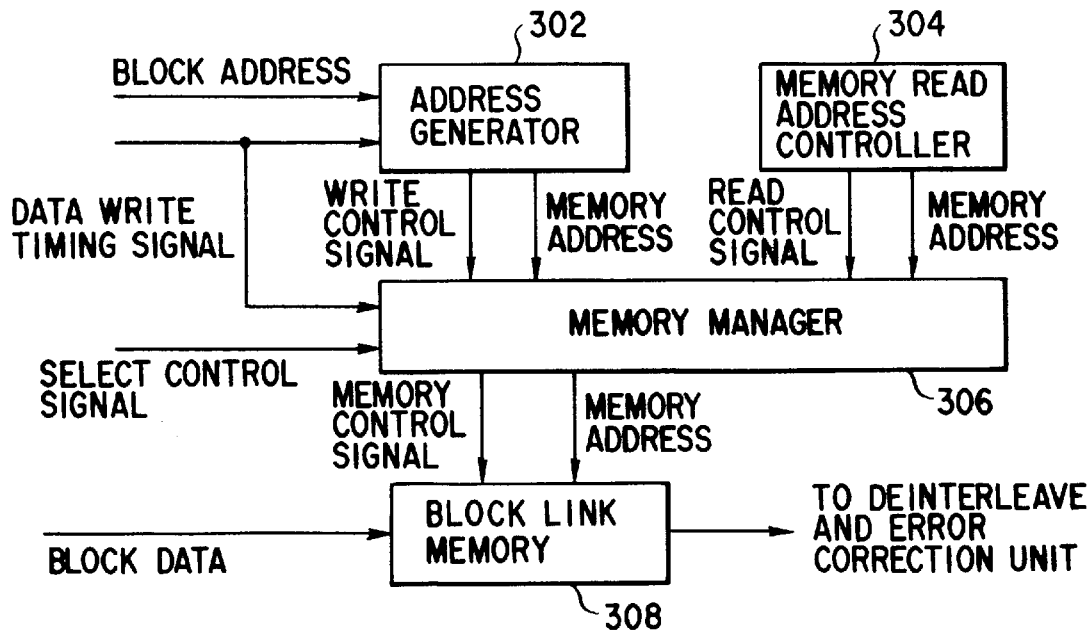
FIG. 9 is a block diagram showing a block link unit in the first embodiment of the information reproduction apparatus of the present invention.

As illustrated in FIG. 9, the block link unit 300 consists of an address generator 302, a memory read address controller 304, a memory manager 306, and a block link memory 308.

This block link unit 300 receives block addresses, a data write timing signal, a select control signal, and block data from the image unit block data reproduction unit 200, and outputs data stored in the block link memory 308 to the deinterleave and error correction unit 400.

That is, the address generator 302 generates memory addresses such that the block data is recorded in the block link memory 308 on the basis of the block addresses from the image unit block data reproduction unit 200. In this case the address generator 302 generates the memory addresses such that, for example, data in block 1 and data in block 2 are written in different addresses. The memory read address controller 304 reads out the data from this block link memory 308 and generates memory addresses to be delivered to the deinterleave and error correction unit 400. In this case the memory read address controller 304 generates the memory addresses in a necessary order for deinterleave. The memory manager 306 selects the output memory addresses from the address generator 302 and the output memory addresses from the memory read address controller 304 during a write operation or controls execute/inhibit of a write operation. This control is done in units of blocks or block data in accordance with the select control signal from the image unit block data reproduction unit 200.

One example of the image unit block data reproduction unit 200 will be described below with reference to FIG. 10.

This image unit block data reproduction unit 200 is so designed as not to process already input blocks and comprises a frame unit block detector 202, a block unit block address detector 204, a block unit dot detector 206, a controller 208, an image memory 210, a parallel data unit data demodulator 212, a control bus 214, and an input check memory 216. The controller 208 includes a block selection unit 208A for selecting blocks.

The frame unit block detector 202 detects a block from image data output from the imaging unit 100 by finding the marker (reference numeral 10 in FIG. 1) and the array direction detecting code (reference numeral 12 in FIG. 1) of the block. The block unit block address detector 204 detects the block address (reference numeral 14 in FIG. 1) at a predetermined position of the detected block. The controller 208 outputs the block address detected by the block unit block address detector 204.

The image memory 210 stores the image data from the imaging unit 100. The block unit dot detector 206 reads out the image data from the image memory 210 in units of blocks detected by the frame unit block detector 202, detects block recorded data, and outputs the detected data to the parallel data unit data demodulator 212. The demodulator 212 demodulates the input data and outputs the block data. As an example, when 8–10 modulation is performed in data recording to the recording medium 600, the demodulator 212 performs 10–8 demodulation and outputs the 8-bit data to the block link unit 300. Also, when this unit, i.e., the 8–10 modulation is used the demodulator 212 outputs a timing signal indicating a data write timing for every one byte (8 bits).

Note that the input check memory 216 stores information indicating whether each block is already input in the addresses of already input blocks.

The operation of the image unit block data reproduction unit 200 with the above arrangement will be described below with reference to the flow chart in FIG. 11. This flow chart is primarily controlled by the controller 208.

First, the operation is started by turning on a power switch SW (not shown), and the controller 208 waits until an operation switch SW (not shown) is turned on (step S1).

When an operator turns on the operation switch SW, the imaging unit 100 inputs an image (step S2), and the frame unit block detector 202 performs block detection in units of frames in the image (step S3).

The controller 208 checks whether a block is detected (step S4). If a block is detected, the block unit block address detector 204 detects a block address (step S5). In this detector 204 an error correction for the block address or the like processing is performed.

Subsequently, as block select processing, the controller 208 reads out information of the detected block address from the input check memory 216 (step S6) and compares the readout detected block address with the detected block address described above, checking whether this block address is already input (step S7). If the block address is already input, without performing the subsequent processing the flow returns to step S3 to repeat the above processing. That is, if the block address is already input, neither the subsequent dot detection in units blocks nor data demodulation in units of parallel data is performed. This can increase the processing speed.

On the other hand, if the block address is not input yet, the block unit dot detector 206 performs dot detection in units of blocks (step S8). Also, the parallel data unit data demodulator 212 performs data demodulation in units of parallel data (step S9). Thereafter, the flow returns to step S3 to repeat the above processing.

If no block is detected in step S4, on the other hand, the controller 208 performs processing for completion determination (step S10). If completion is not detected (step S11), the flow returns to step S2 to continue the processing.

The completion determination in step S10 can be accomplished by detecting whether the operation switch SW is OFF. Alternatively, completion can be determined if no block is detected in a frame or if a white image (a portion in which no code is printed on a sheet) is photographed. When this method is used and the dot code is scanned from the left end to the right end, the left end portion which is not a code is first imaged in some instances. Therefore, the method can also be altered so that the image input is not terminated but repeatedly executed even if the first several frames indicate a white image or an image having no blocks. Also, the processing can be terminated when no blocks are detected in several consecutive frames. Furthermore, the processing can be ended when no blocks are detected in input images after a block is once detected. As described above, in this completion determination the state of a switch or an image is checked.

The second embodiment of the information reproduction apparatus of the present invention will be described below.

This second embodiment employs an overwrite type image unit block data reproduction unit 200. That is, in the above first embodiment the image unit block data reproduction unit 200 detects already input blocks to inhibit an input of the same block. In contrast, in this embodiment the reproduction unit 200 processes all blocks and transfers them to a block link unit 300.

FIG. 12 is a block diagram showing the arrangement of the image unit block data reproduction unit 200 of this embodiment. This reproduction unit 200 consists of a frame unit block detector 202, a block unit block address detector 204, an image memory 210, and a block unit data detector 218. This block unit data detector 218 executes the functions of the block unit dot detector 206 and the parallel data unit data demodulator 212 in the first embodiment.

That is, data is written in a block link memory 308 of the block link unit 300. In this second embodiment, however, if the same block as already written in the memory 308 is imaged, this block is overwritten in the corresponding position (address) of the memory 308, and the data of the lately input block is rendered effective.

Accordingly, the processing speed is increased because no determination processing is performed. Also, since the arrangement is simplified the hardware can be readily formed into ICs.

The third embodiment of the information reproduction apparatus of the present invention will be described below.

In this third embodiment, an image unit block data reproduction unit 200 has a function of selecting block data.

Figure 13:
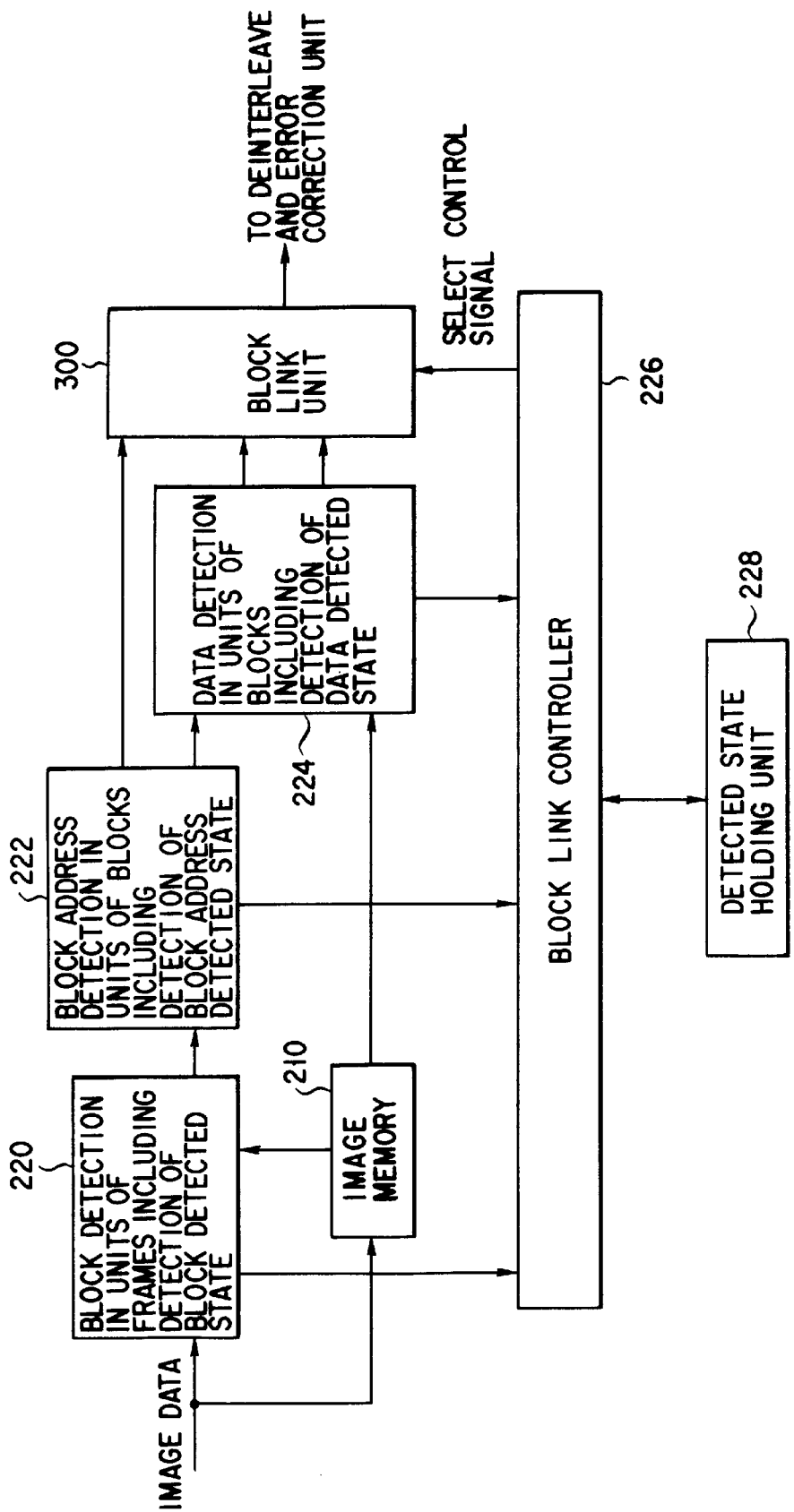
FIG. 13 is a block diagram showing an image unit block data reproduction unit with a block data selecting function in the third embodiment of the information reproduction apparatus of the present invention.

That is, as illustrated in FIG. 13, this image unit block data reproduction unit 200 comprises a frame unit block detector 220, a block unit block address detector 222, an image memory 210, a block unit data detector 224, a block link controller 226, and a detected state holding unit 228.

The frame unit block detector 220 has a function of detecting a block detected state, the block unit block address detector 222 has a function of detecting a block address detected state, and the block unit data detector 224 has a function of detecting a data detected state.

The detection of a block detected state performed by the frame unit block detector 220 which includes the block detected state detecting function is as follows. For example, in the marker detection as described in International Application No. PCT/JP93/01377 (International Publication No. WO94/08314), if a dust particle or the like is present on a recording medium and consequently an erroneous detection marker exists, this erroneous detection marker is regarded as noise, and the state (the position, size, and number of erroneous detection markers) of the marker is detected. This block detected state is stored in the detected state holding unit 228. That is, if an erroneous detection marker which corresponds to a marker and is not supposed to be detected in a block is detected, this erroneous detection marker is regarded as noise and its state is held. Consequently, in the subsequent processing it is possible to perform processing of selecting a block having less erroneous detection markers when identical blocks are processed.

The detection of a block address detected state done by the block unit block address detector 222 including the block address detected state detecting function is as follows. If an error is found and corrected when block address error correction included in the block address detection is performed, the corresponding block may contain a large quantity of noise. Therefore, even in such instances the block is recorded as a defective block in the detected state holding unit 228 and a good block is chosen in the subsequent processing.

The detection of a data detected state done by the block unit data detector 224 including the data detected state detecting function is to detect the number and position of data demodulation errors in a block and store them in the detected state holding unit 228. In the subsequent processing, a good block having less demodulation errors or good data free of demodulation errors is selected.

As described above, the detectors 220, 222, and 224 detect information for detecting a good block or good block data, and the information is stored in the detected state holding unit 228.

The block link controller 226 performs control, i.e., writes and reads with respect to the detected state holding unit 228. That is, the block link controller 226 outputs a select control signal to the block link unit 300 and so controls the unit 300 as to select a good block or good block data.

The operation of the image unit block data reproduction unit 200 with the above arrangement will be described below with reference to the flow chart in FIG. 14.

The operation is started by turning on a power switch SW (not shown), and, as initialization, data in the worst state is stored for each block and each processing in the detected state holding unit 228 (step S21). This is accomplished by the block link controller 226 by selecting data in a good state. Since, however, no already input blocks are initially present, data in a bad state is stored in the detected state holding unit 228. Consequently, the select processing described above can be simply done in the subsequent processing without performing detection determination of whether imaging is performed for the first time, i.e., a block is input for the first time.

Thereafter, the operation waits until an operation switch SW (not shown) is turned on (step S22). If an operator turns on the operation switch SW, an imaging unit 100 inputs an image (step S23). The frame unit block detector 220 including the detection of a block detected state performs block detection in units of frames for the input image (step S24). If no block is detected (step S25), the flow returns to step S23 to input another image.

If a block is detected, each of the detectors 220, 222, and 224 performs the processing including the detection of a detected state described above (step S26).

A block address is then checked (step S27). This is accomplished by reading out an output block address from the block unit block address detector 222 including the detection of a block address detected state.

Subsequently, an already detected block detected state of the input block address is read out from the detected state holding unit 228, i.e., the detected state of the previously input block having the same address is read out (step S28). Errors of the detected state in each detection and of the detected state of the already detected block are compared (step S29).

In accordance with the comparison result, data or a block having less errors or a lower error probability is selected, and the select control signal is so controlled as to cause a memory manager 306 in the block link unit 300 to select the data (step S30).

The detected state of this selected data or block is overwritten in the detected state holding unit 228 (step S31). That is, if the data of the presently imaged block is good, the data of the block is written in a block link memory 308 (FIG. 9) of the block link unit 300. Also, the state of that block is overwritten in the detected state holding unit 228.

Figure 11:
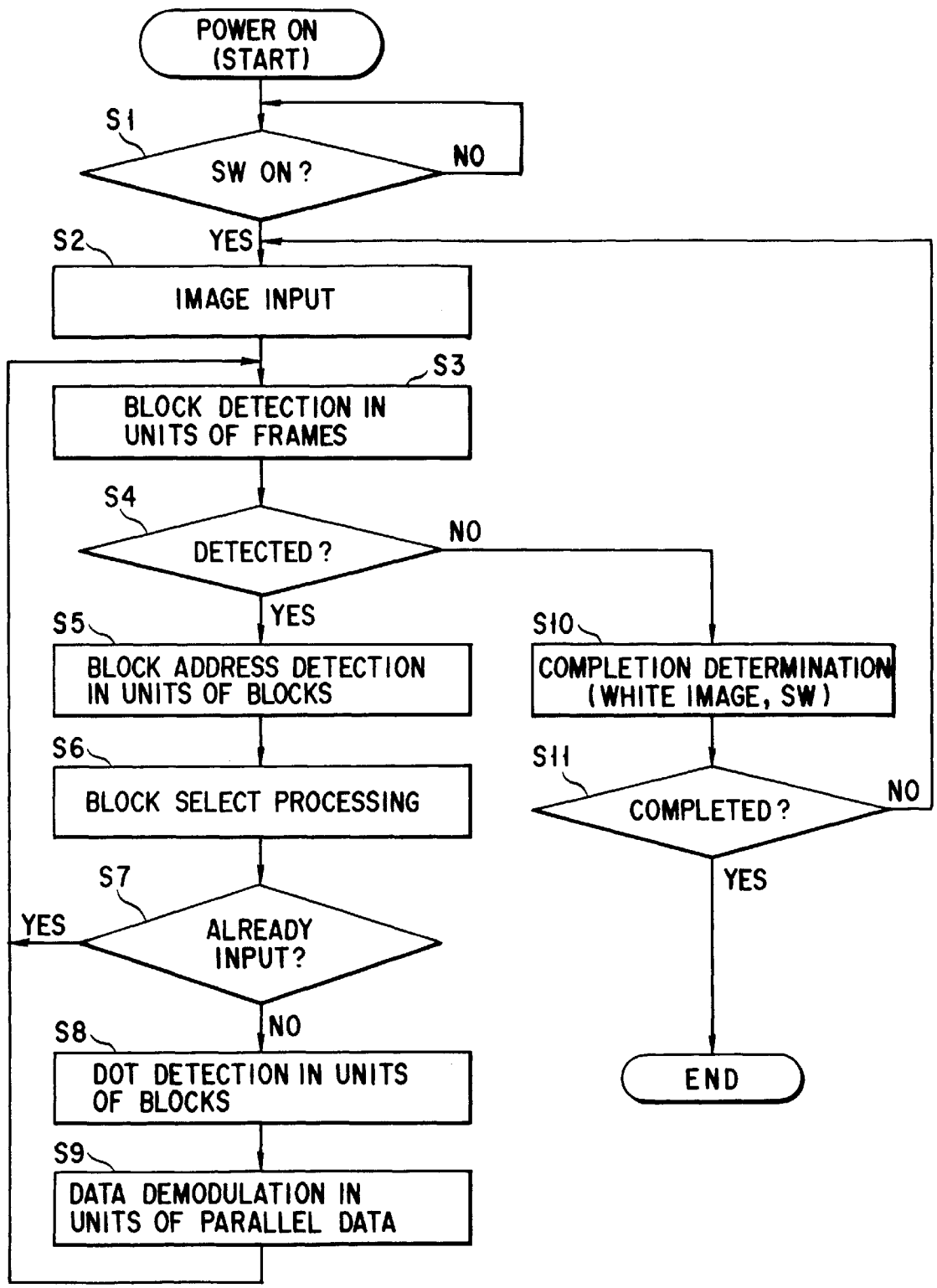
FIG. 11 is a flow chart showing the operation of the image unit block data reproduction unit in FIG. 10.

Finally, completion determination is performed in the same manner as in step S10 of FIG. 11 (step S32). If completion is not determined, the flow returns to step S24 to repeat the above processing.

Dot codes used in the fourth embodiment of the information recording medium of the present invention will be described below. This fourth embodiment solves the problem of an unread portion, i.e., a portion which is not read at the left end and/or the right end of a dot code.

Figure 15A:
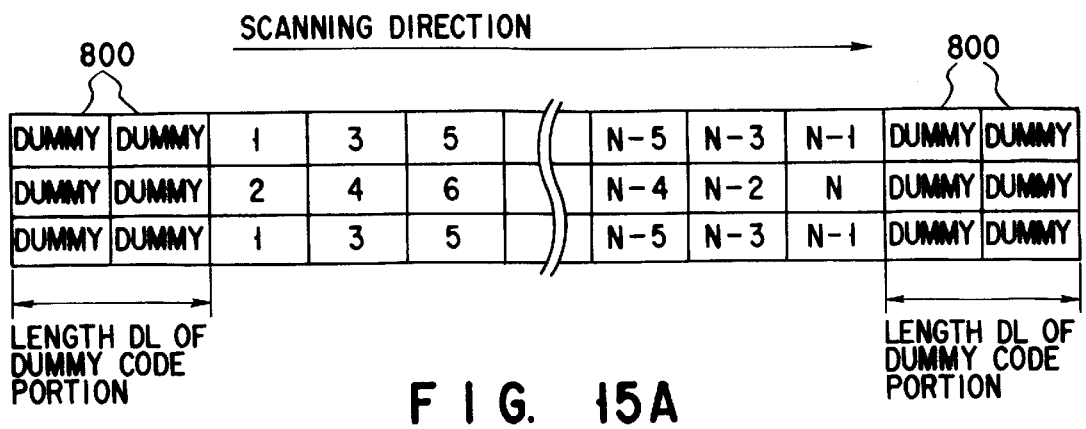
FIG. 15A is a view showing an example of the block array of a dot code added with dummy blocks used in the fourth embodiment of the information recording medium of the present invention.

In the fourth embodiment, as shown in FIG. 15A, a dot code is recorded on an information recording medium after dummy blocks 800 are added to the left and the right ends of the dot code. A length DL of the dummy code portion constructed of the dummy blocks 800 is made larger than the distance from the casing to the imaging area, FIG. 2C. Consequently, a portion which is not read when an operator sets a reader at the left end so as to cover the dot code corresponds to the dummy blocks 800. This can avoid an event in which a necessary code is left unread.

Figure 15B:
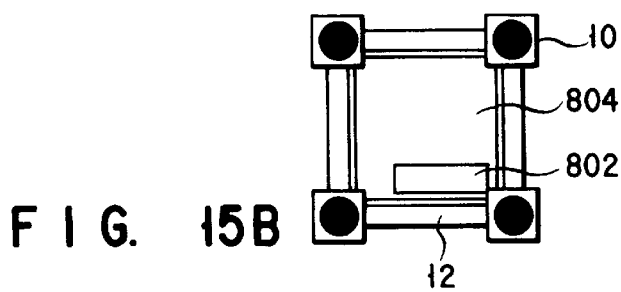
FIG. 15B is a view showing the arrangement of the dummy block in FIG. 15A.

To give the dummy block 800 an arrangement similar to that of the block illustrated in FIG. 1A, the dummy block 800 can be constituted by markers 10, an array direction detecting code 12, a dummy block address 802, and dummy block dummy data dots 804, as shown in FIG. 15B. In the example shown in FIG. 15A, there are block addresses "1" to "N" and there is no block address "0". Therefore, this block address 0 can be used as the block address 802 of the dummy block 800 to check whether this block is a dummy block 800. Alternatively, if the block address contains an error correcting code, a code by which the block address is regarded as an error is recorded. As a result, this code is detected as a block error in reproduction processing, and this can prevent the block from being processed.

Also, the dummy block 800 need not have the same structure as a non-dummy block and it suffices if it has essentially no data to be reproduced. That is, the dummy block need only have a structure which an operator can visually recognize as a dot code.

Finally, dot codes used in the fifth embodiment of the information recording medium of the present invention will be described below.

Figure 2A:
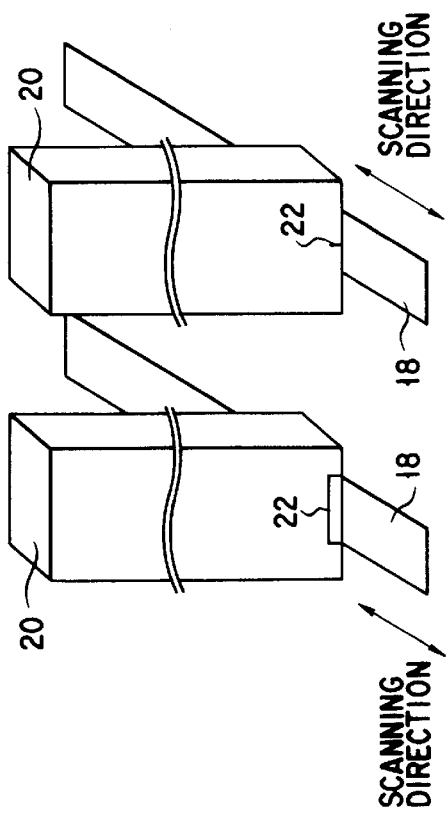
FIG. 2A is a view showing conventionally predicted scanning position indication marks of a reader and the relationship between the dot code and the reader.
Figure 2B:
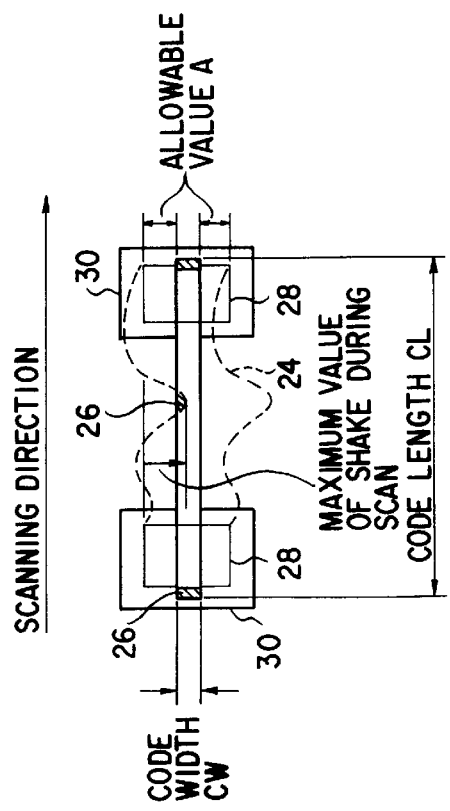
FIG. 2B is a view showing a conventional relationship between the imaging area and the dot code resulting from a scan shake.

As shown in FIG. 2A, recorded information is reproduced by scanning the code with the reader. During the reproduction, the imaging unit 100, FIG. 8, incorporated into the reader outputs a plurality of images in one scan. The imaging range of one image has a size containing a plurality of blocks only by one-time imaging of the code. That is, as illustrated in FIG. 7, the imaging range has an effective imaging width larger than [effective code width CEW+1-block vertical size] in a direction perpendicular to the scanning direction in order to allow a shake, and a size larger than a horizontal size of two blocks in the scanning direction in order to reliably reproduce one or more blocks.

The output period of images from the imaging unit 100, FIG. 8, when a CCD used in a video camera or the like apparatus is used, is usually 15 to 20 ms by which one field image is picked up and output. Also, to prevent blur of images, imaging is done by using a shutter, or light emission from a light source, of about 100 $\mu$s. That is, since imaging is performed for every 15 to 20 ms, if the scanning rate is too high blocks that are not imaged result, and this makes reproduction impossible.

More specifically, assume that the effective imaging size of the reader, with respect to blocks of the code in FIG. 5A, has a 3-block vertical size in a direction (vertical direction) perpendicular to the scanning direction and a 3-block horizontal size in the scanning direction. If the 1-block vertical size is 2 mm and the 1-block horizontal size is 2 mm, the effective imaging size is 6 mm (vertical)×6 mm (horizontal). A reader having this effective imaging size can reliably image two blocks in the vertical direction and two blocks in the horizontal direction in one image. Also, if the imaging period is 20 ms, the reader moves in this period of 20 ms during the scan. Therefore, to reliably image all blocks it is necessary to scan at a rate of 200 mm/s or lower.

This rate 200 mm/s is calculated as follows:

$$= \frac{\text{number of block columns capable of being reliably imaged in one image} \times \text{1-block horizontal size}}{\text{imaging period}}$$

$$= \frac{2 \times 2[\text{mm}]}{20[\text{ms}]}$$

$$= 200[\text{mm/s}]$$

In contrast, if scan is performed at a rate higher than 200 mm/s, blocks that cannot be imaged result, and this makes reproduction impossible.

An embodiment which solves this problem will be described below with reference to FIG. 16A.

Figure 16A:
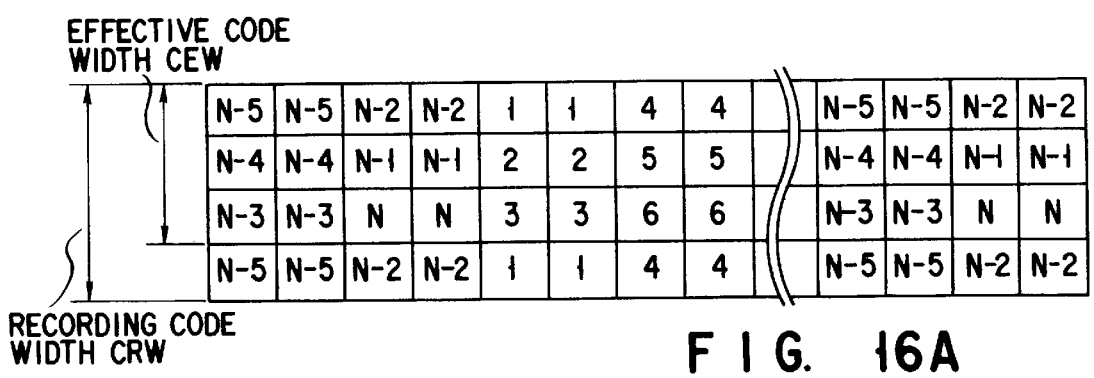
FIGS. 16A and 16B are views showing examples of the block array of a dot code used in the fifth embodiment of the information recording medium of the present invention.

That is, FIG. 16A shows an array of blocks with addresses like that in FIG. 1C. In FIG. 16A, two columns of identical blocks are continuously recorded in the block array shown in FIG. 5A.

When the code is scanned at 200 mm/s to 300 mm/s, one of three consecutive block columns is in some cases not imaged. Even if this is the case, since identical block columns are continuously arranged in the code illustrated in FIG. 16A, all blocks can be stably reproduced without producing any blocks of addresses which are not imaged.

When the code in which two identical block columns are continuously recorded as in this fifth embodiment is scanned at a high rate, all blocks having necessary addresses can be imaged and stably reproduced even if one of two consecutive block columns is not imaged.

As a consequence, a scanning rate of up to 300 mm/s is allowable for the code of the this fifth embodiment, whereas for the code illustrated in FIG. 5A the allowable scanning rate by which reproduction is possible is 200 mm/s or lower.

This embodiment has been described by taking as an example a code in which two identical block columns are continuously recorded. However, the number of block columns is, of course, not limited to two, and so reproduction at a higher allowable scanning rate is possible when N (N>2) columns are continuously recorded. When a code of this sort is reproduced, even if [N−1] consecutive block columns of the N consecutive block columns are not imaged, all blocks having necessary addresses can be imaged and stably reproduced.

A modification of the fifth embodiment will be described below with reference to FIG. 16B.

Figure 16B:
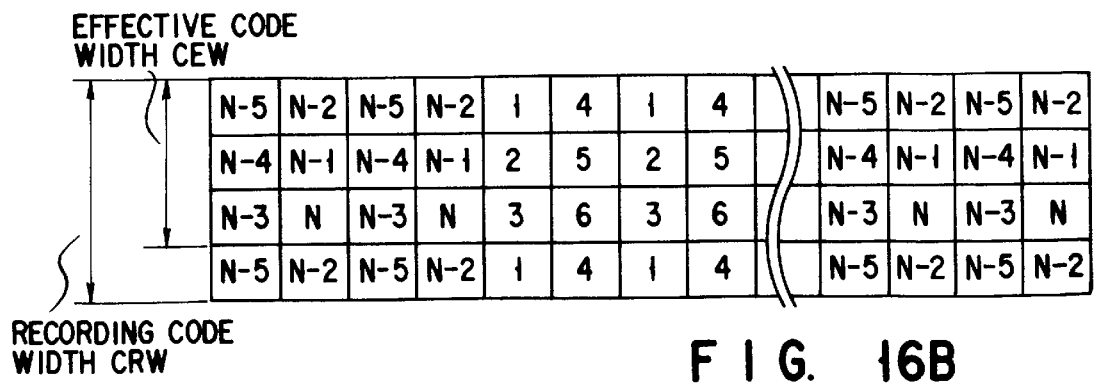

FIG. 16B shows an array of blocks having addresses like that shown in FIG. 1C. In FIG. 16B, all two consecutive block columns are regarded as pairs, and two identical pairs are continuously recorded in the block array shown in FIG. 5A.

A code having this arrangement is reproduced by using a reproduction apparatus capable of imaging at least two blocks in the scanning direction, i.e., having an imaging range of one image of a 3-block horizontal size or larger in the scanning direction.

When this code is scanned at 200 mm/s to 400 mm/s, all blocks having necessary addresses can be imaged and stably reproduced.

As a consequence, a scanning rate of up to 400 mm/s is allowable for the code with this arrangement, whereas for the code illustrated in FIG. 5A the allowable scanning rate by which reproduction is possible is 200 mm/s or lower.

This modification has been described by taking as an example a code in which two identical block columns are consecutively recorded. However, the number of block columns is, of course, not limited to two, and so reproduction at a higher allowable scanning rate is possible when N (N>2) columns are continuously recorded.

Also, the reproduction apparatus is not restricted to the one which can image two blocks and has a one-image imaging range of a 3-block horizontal size or larger in the scanning direction.

That is, in a recording medium to be reproduced by a reproduction apparatus which can image at least [M−1] blocks within a one-image imaging range in the scanning direction, i.e., which has an imaging range larger than an M-block horizontal size, all N consecutive block columns are regarded as sets, and K identical sets are continuously recorded. Assuming the imaging period at which one image is photographed is T and the 1-block horizontal size (the block size in the scanning direction) is $D_b$, a reliable reproduction is possible even if scan is done at the maximum scanning rate described below. Also, a stable reproduction at a higher scanning rate is possible by increasing N, M, and K. More specifically, $$\text{maximum rate} \approx \frac{\{M + N \times (K-1) - 1\} \times D_b}{T}$$

(where N≧2, M>2, K≧2, N<M, and each of N, M, and K is an integer).

As described above, the relationship between the imaging range of a reproduction apparatus and the duplication of blocks is preferably a similar array relationship also in the direction perpendicular to the scanning direction. This makes it possible to compensate for a larger shake and the speed of that shake.

The embodiments of the present invention have been described above. However, the present invention is not limited to these embodiments, and various modifications and applications can be made without departing from the gist of the invention. The gist of the present invention is summarized below.

(1) An information recording medium including a portion in which an optically readable data code pattern is recorded, the data code pattern consisting of a group of a plurality of blocks arranged in a matrix manner, and each block having a data dot pattern consisting of a plurality of dots arranged in accordance with contents of data and a block address pattern arranged to have a predetermined positional relationship with the data dot pattern and indicating an address of the block, wherein the data code pattern is formed by doubly arranging blocks identical with blocks in a predetermined area of the blocks arranged in the block group.

That is, as shown in FIGS. 3A and 3B, FIGS. 4A to 4C, FIGS. 5A to 5C, and FIG. 6, blocks in a predetermined region are doubly recorded. Accordingly, in manually scanning the imaging unit of the information reproduction apparatus, even if the scan is roughly performed without taking account of a shake or a shift of the setting from the start point (and/or the end point) of the scan, it is possible to reliably scan a necessary data code pattern.

(2) An information recording medium including a portion in which an optically readable data code pattern is recorded, the data code pattern consisting of a group of a plurality of blocks arranged in a matrix manner, and each block having a data dot pattern consisting of a plurality of dots arranged in accordance with contents of data and a block address pattern arranged to have a predetermined positional relationship with the data dot pattern and indicating an address of the block, wherein the data code pattern is formed by doubly arranging blocks (block columns), which are identical with blocks (block columns) arranged in the block group in at least one of a scan start end and a scan termination end of the block group, in at least the other of the scan start end and the scan termination end.

That is, as shown in FIGS. 5A to 5C and FIG. 6, blocks (block columns) identical with the blocks (block columns) arranged in the scan start (termination) end portion are doubly recorded in the scan termination (start) end portion. Accordingly, in manually scanning the imaging unit of the information reproduction apparatus, even if the scan is roughly performed without taking account of a shake or a shift of the setting from the start point (and/or the end point) of the scan, it is possible to reliably scan a necessary data code pattern.

(3) An information recording medium including a portion in which an optically readable data code pattern is recorded, the data code pattern consisting of a group of a plurality of blocks arranged in a matrix manner, and each block having a data dot pattern consisting of a plurality of dots arranged in accordance with contents of data and a block address pattern arranged to have a predetermined positional relationship with the data dot pattern and indicating an address of the block, wherein the data code pattern is formed by doubly arranging blocks (block rows), which are identical with blocks (rows) arranged parallel to a scanning direction of the block group and arranged in at least one of an uppermost portion and a lowermost portion of the block group, in at least the other of the uppermost portion and the lowermost portion.

That is, as shown in FIGS. 3A and 3B and FIGS. 4A to 4C, blocks (rows) identical with the blocks (rows) arranged in the uppermost (lowermost) portion of the block group are doubly recorded in the lowermost (uppermost) portion. Accordingly, in manually scanning the imaging unit of the information reproduction apparatus, even if the scan is roughly performed without taking account of a shake or a shift of the setting from the start point (and/or the end point) of the scan, it is possible to reliably scan a necessary data code pattern.

(4) An information recording medium including a portion in which an optically readable data code pattern is recorded, the data code pattern consisting of a group of a plurality of blocks arranged in a matrix manner, and each block having a data dot pattern consisting of a plurality of dots arranged in accordance with contents of data and a block address pattern arranged to have a predetermined positional relationship with the data dot pattern and indicating an address of the block, wherein the data code pattern is formed by arranging dummy blocks, each of which has a shape not visually different from the blocks and does not essentially have data contents, in a predetermined peripheral region of the block group.

That is, as shown in FIGS. 15A and 15B, the dummy blocks are arranged in a predetermined peripheral portion of the block group. Accordingly, in manually scanning the imaging unit of the information reproduction apparatus, even if the scan is roughly performed without taking account of a shake or a shift of the setting from the start point (and/or the end point) of the scan, it is possible to reliably scan a necessary data code pattern.

(5) The information recording medium described in item (4) above, wherein the dummy blocks are so arranged as to have a length larger than a distance from a casing, which covers an imaging unit of an information reproduction apparatus for optically reading and reproducing the data code pattern, to an imaging area of the imaging unit.

That is, as shown in FIGS. 15A and 15B, the dummy blocks are so arranged as to have a length larger than the distance from the housing of the information reproduction apparatus to the imaging area. Accordingly, in manually scanning the imaging unit of the information reproduction apparatus, even if the scan is roughly performed without taking account of a shake or a shift of the setting from the start point (and/or the end point) of the scan, it is possible to reliably scan a necessary data code pattern.

(6) An information recording medium including a portion in which an optically readable data code pattern is recorded, the data code pattern consisting of a group of a plurality of blocks arranged in a matrix manner, and each block having a data dot pattern consisting of a plurality of dots arranged in accordance with contents of data and a block address pattern arranged to have a predetermined positional relationship with the data dot pattern and indicating an address of the block, wherein the data code pattern is formed by doubly arranging a larger number of outside blocks than the number of inside blocks of blocks (block rows) arranged parallel to a scanning direction of the block group.

That is, as shown in FIGS. 5A to 5C and FIG. 6, a larger number of outside blocks than the number of inside blocks are doubly recorded. Accordingly, in manually scanning the imaging unit of the information reproduction apparatus, even if the scan is roughly performed without taking account of a shake or a shift of the setting from the start point (and/or the end point) of the scan, it is possible to reliably scan a necessary data code pattern.

(7) An information reproduction apparatus comprising reading means for optically reading a data code pattern from an information recording medium described in any of items (1) to (6) above, restoring means for converting the data code pattern read by the reading means into original multimedia information including at least one of audio information, video information, and digital code data, and output means for outputting the multimedia information restored by the restoring means, wherein the reading means includes an imaging unit for imaging the data code pattern recorded on the information recording medium, and the restoring means includes a restoration controller for controlling the restoration such that if a plurality of doubly arranged blocks of the data code pattern are doubly imaged by the imaging unit, these doubly recorded blocks are not doubly restored.

That is, as shown in FIG. 8, in manually scanning the imaging unit of the information reproduction apparatus, even if the scan is roughly performed without taking account of a shake or a shift of the setting from the start point (and/or the end point) of the scan, it is possible to reliably scan a necessary data code pattern.

Also, the control is so performed that doubly recorded blocks are not doubly restored. Consequently, no extra processing needs to be performed, and this makes high-speed processing possible.

(8) An information reproduction apparatus comprising reading means for optically reading a data code pattern from an information recording medium described in any of items (1) to (6) above, restoring means for converting the data code pattern read by the reading means into original multimedia information including at least one of audio information, video information, and digital code data, and output means for outputting the multimedia information restored by the restoring means, wherein the reading means includes an imaging unit for imaging the data code pattern recorded on the information recording medium, and the restoring means includes processing means for restoring the data code pattern in units of blocks, and a restoration controller for controlling the restoration such that in restoring a doubly recorded block of the data code pattern by the processing means, if an identical block already restored is present, data of the newly restored block is output in place of data of the identical block.

That is, as shown in FIG. 12, in manually scanning the imaging unit of the information reproduction apparatus, even if the scan is roughly performed without taking account of a shake or a shift of the setting from the start point (and/or the end point) of the scan, it is possible to reliably scan a necessary data code pattern.

Also, in reproducing doubly recorded blocks, the control is so performed that the same block data once reproduced is overwritten on the memory. Consequently, it is possible to omit extra processing such as determination in the subsequent circuit, and this makes high-speed processing feasible.

(9) An information reproduction apparatus comprising reading means for optically reading a data code pattern from an information recording medium described in any of items (1) to (6) above, restoring means for converting the data code pattern read by the reading means into original multimedia information including at least one of audio information, video information, and digital code data, and output means for outputting the multimedia information restored by the restoring means, wherein the reading means includes an imaging unit for imaging the data code pattern recorded on the information recording medium, and the restoring means includes processing means for restoring the data code pattern in units of blocks, detected state determining means for determining detected states of a block, a block address, and data in units of blocks, and a restoration controller for controlling the restoration, in accordance with the detected states determined by the detected state determining means, such that block data in a good detected state is selectively output from the doubly recorded block data.

Figure 14:
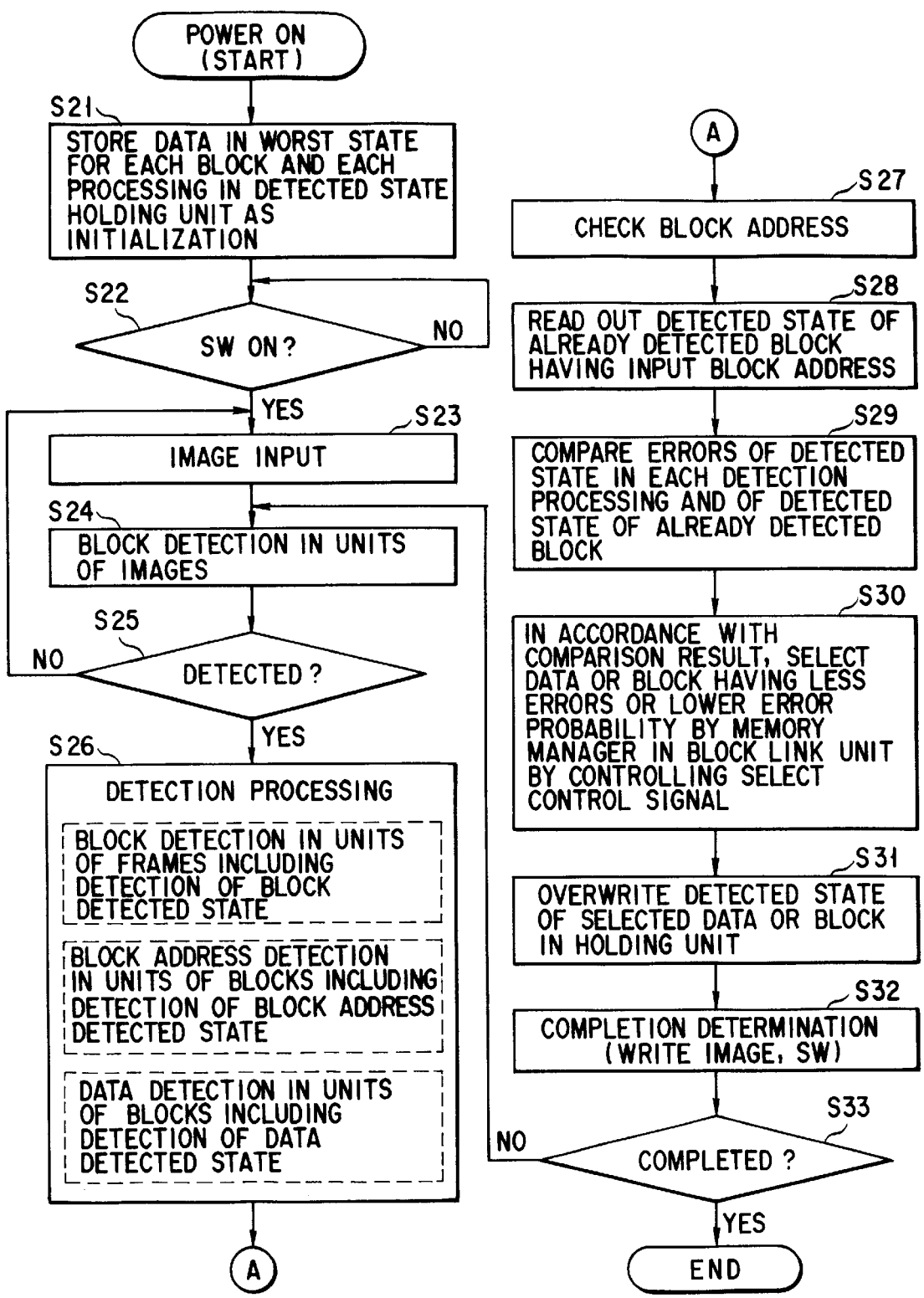
FIG. 14 is a flow chart showing the operation of the image unit block data reproduction unit in FIG. 13.

That is, as shown in FIGS. 13 and 14, in manually scanning the imaging unit of the information reproduction apparatus, even if the scan is roughly performed without taking account of a shake or a shift of the setting from the start point (and/or the end point) of the scan, it is possible to reliably scan a necessary data code pattern.

Also, in reproducing doubly recorded blocks, the control is so performed that of the reproduced block data in a good state is selectively output. Consequently, it is possible to omit extra processing in the subsequent circuit, and this makes high-speed processing feasible.

(10) The information reproduction apparatus described in any of items (7) to (9) above, wherein the restoration controller includes
a reproduction unit for detecting blocks from the data code pattern imaged by the imaging unit and performing processing such as address detection, binarization, and demodulation for each block, and
a block link unit for linking the data reproduced in units of blocks by the reproduction unit on the basis of block addresses reproduced from the block address pattern.

That is, as shown in FIG. 8, individual block data are linked by the block link unit. Accordingly, the data code can be stably reproduced even if the relationship between the blocks arranged in the data code and the scanning direction of the data code are randomly set.

(11) The information reproduction apparatus described in item (10) above, wherein the reproduction unit includes a block selecting unit for checking whether data to be processed in units of blocks is already processed and controlling processing for each block such that no processing is performed for a block of already processed block data.

That is, as shown in FIG. 10, in reproducing a doubly recorded block, whether this block is already reproduced is checked. If the block is already reproduced, the control is so performed that the block is not doubly restored. Consequently, no extra processing needs to be performed, and this makes high-speed processing possible.

(12) The information reproduction apparatus described in any of items (7) to (9) above, wherein an effective imaging width capable of being imaged in a scanning direction by the imaging unit is not less than a sum of an effective code width of the data code pattern and at least one block width of a doubly recorded code.

That is, as shown in FIG. 7, in manually scanning the imaging unit of the information reproduction apparatus, even if the scan is roughly performed without taking account of a shake or a shift of the setting from the start point (and/or the end point) of the scan, it is possible to reliably scan a necessary data code pattern. Furthermore, since the information amount obtained by one-time imaging can be increased, the scanning time and the scanning distance can be shortened. This makes high-speed processing possible.

(13) An information reproduction apparatus comprising
reading means for optically reading an optically readable data code pattern from an information recording medium including a portion in which the data code pattern is recorded,
restoring means for converting the data code pattern read by the reading means into original multimedia information including at least one of audio information, video information, and digital code data, and
output means for outputting the multimedia information restored by the restoring means,
wherein the reading means includes an imaging unit for imaging the data code pattern recorded on the information recording medium, and
the restoring means includes processing terminating means for terminating the restoration if the imaging means determines that an image different from the data code pattern is detected for a predetermined time.

That is, as shown in FIGS. 11 and 14, no switch is necessary to terminate the processing, so high-speed processing can be performed without any termination operation done by an operator. This can achieve a low cost and a low consumption power.

(14) An information recording medium including a portion in which an optically readable data code pattern is recorded, the data code pattern consisting of a group of a plurality of blocks arranged in a matrix manner, and each block having a data dot pattern consisting of a plurality of dots arranged in accordance with contents of data and a block address pattern arranged to have a predetermined positional relationship with the data dot pattern and indicating an address of the block,
wherein a reproduction apparatus for optically reading the data code pattern and reproducing the data has an imaging unit whose imaging range of one image can image at least [M−1] blocks in a scanning direction or a direction perpendicular to the scanning direction, the reproduction apparatus performing reproduction from a plurality of images, and
the data code pattern is formed by continuously arranging (recording) K identical sets by regarding N consecutive block columns in the block group (i.e., all effective blocks) as one set.

That is, as shown in FIGS. 16A and 16B, the reproduction apparatus having an imaging unit with an imaging range within which [M−1] blocks are necessarily imaged in the scanning direction reproduces the code in which K identical sets are continuously recorded by regarding N consecutive block columns of all effective blocks as one set. Consequently, by increasing N, M, and K it is possible to perform reproduction even if the scan is done at a higher rate.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An information recording medium, comprising;
a sheet-like member; and
a data code pattern recorded on said sheet-like member and which is optically readable,
wherein:
said data code pattern comprises a group of a plurality of blocks arranged in a matrix manner,
each block has a data dot pattern comprising a plurality of dots arranged in accordance with contents of data and a block address pattern arranged to have a predetermined positional relationship with said data dot pattern and indicating an address of the block, and
said data code pattern includes a portion in which there is recorded at least one block having a data dot pattern and a block address pattern which are identical to those of at least one other of said plurality of blocks.

2. A data recording medium according to claim 1, wherein said data code pattern is formed by arranging identical blocks which have an identical data dot pattern and an identical block address pattern with those of some of the blocks of said data code pattern, said identical blocks being arranged on at least one of a scan start end and a scan termination end of said data code pattern.

3. A data recording medium according to claim 2, wherein said data code pattern is formed by arranging said identical blocks adjacent to blocks which are arranged on at least one of said scan start end and said scan termination end, said identical blocks being provided in at least such a number that a length of said identical blocks arranged is larger than a thickness of a casing in a read scanning direction, taken from an outer wall of said casing, which covers an imaging area of an information reproduction apparatus for optically reading and reproducing said data code pattern, to said imaging area.

4. A data recording medium according to claim 1, wherein said data code pattern is formed by arranging identical blocks which have an identical data dot pattern and an identical block address pattern with those of some of the blocks of said data code pattern, said identical blocks being arranged in at least one of an uppermost position and a lowermost position that are determined with respect to a direction normal to a reading scanning direction of said data code pattern.

5. A data recording medium according to claim 4, wherein said data code pattern is formed by arranging said identical blocks adjacent to one another, said identical blocks being provided in at least such a number that a length of said identical blocks arranged is larger than a thickness of a casing in a direction normal to a read scanning direction, taken from an outer wall of said casing, which covers an imaging area of an information reproduction apparatus for optically reading and reproducing said data code pattern, to said imaging area.

6. An information recording medium, according to claim 1,
   wherein:
   said data code pattern is formed by arranging identical blocks which have an identical data dot pattern and an identical block address pattern with those of some of the blocks of said data code pattern, said identical blocks being arranged in such a manner that a block address thereof is repeated at a predetermined period in at least one of a column direction and a row direction of said data code pattern.

7. An information recording medium according to claim 1, wherein said data code pattern includes at least one identical block row arranged at at least one of an uppermost position and a lowermost position that are determined with respect to a direction normal to a reading scanning direction of said data code pattern, said identical block row being identical to at least one of block rows that constitute said data code pattern.

8. An information recording medium according to claim 7, wherein the identical block row arranged at at least one of the uppermost and lowermost positions that are determined with respect to the direction normal to the reading scanning direction of said date code pattern, is adjacent to said data code pattern.

9. An information recording medium according to claim 2, wherein said data code pattern includes at least one identical block column arranged at at least one of a read scan start end and a read scan termination end of said data code pattern, said identical block column being identical to at least one of block columns that constitute said data code pattern.

10. An information recording medium according to claim 9, therein the identical block column arranged at at least one of the read scan start end and the read scan termination end of said data code pattern, is adjacent to the data code pattern.

11. An information recording medium, comprising:
   a sheet-like member; and
   a data code pattern recorded on said sheet-like member and which is optically readable,
   wherein:
   said data code pattern comprises a group of a plurality of blocks arranged in a matrix manner,
   each block has a data dot pattern comprising a plurality of dots arranged in accordance with contents of data and a block address pattern arranged to have a predetermined positional relationship with said data dot pattern and indicating an address of the block, and
   said data code pattern is formed by arranging dummy blocks, each of which appears for a user, to have an identical structure with that of a block in said data code pattern when said user monitors said data code pattern so as to read said data code pattern by manual scanning, and lacks substantial data contents, in a predetermined peripheral region of said data code pattern.

12. A data recording medium according to claim 11, wherein said dummy blocks are arranged in at least such a number that a length of said dummy blocks arranged is larger than a thickness of a casing in a read scanning direction or a thickness of a casing in a direction normal to a read scanning direction, taken from an outer wall of said casing, which covers an imaging area of an information reproduction qapparatus for optically reading and reproducing said data code pattern, to said imaging area.

* * * * *